United States Patent [19]

Amimoto et al.

[11] Patent Number: 4,728,707

[45] Date of Patent: Mar. 1, 1988

[54] WATER- AND OIL-REPELLENT

[75] Inventors: Yoshio Amimoto; Hirokazu Aoyama, both of Takatsuki; Akira Chida, Settsu, all of Japan

[73] Assignee: Daikin Industries Ltd., Osaka, Japan

[21] Appl. No.: 838,945

[22] Filed: Mar. 12, 1986

[30] Foreign Application Priority Data

Mar. 18, 1985 [JP] Japan ................... 60-55262

[51] Int. Cl.$^4$ .................. C08F 20/22; C08F 12/30
[52] U.S. Cl. .................... 526/243; 526/245; 526/246
[58] Field of Search ............ 526/243, 245, 246

[56] References Cited

U.S. PATENT DOCUMENTS

| 3,102,103 | 8/1963 | Ahlbrecht et al. | 526/245 |
| 3,356,628 | 12/1967 | Smith et al. | 526/245 |
| 3,459,696 | 8/1969 | Read | 526/245 |
| 3,491,169 | 1/1970 | Raynolds et al. | 526/245 |
| 3,547,856 | 12/1970 | Tandy | 526/245 |
| 3,637,614 | 1/1972 | Greenwood | 526/245 |
| 3,919,183 | 11/1975 | Jager et al. | 526/245 |
| 3,920,614 | 11/1975 | Kirimoto et al. | 526/245 |
| 3,997,507 | 12/1976 | Kirimoto et al. | 526/245 |
| 4,100,340 | 7/1978 | Waldmann et al. | 526/245 |

Primary Examiner—Edward J. Smith
Assistant Examiner—Peter D. Mulcahy
Attorney, Agent, or Firm—Birch, Stewart, Kolasch & Birch

[57] ABSTRACT

A water- and oil-repellent of a copolymer which comprises repeating units derived from (a) a monomeric compound having at least a perfluoroalkyl or perfluoroalkenyl group and an acrylate or methacrylate group and (b) a methacrylate, a homopolymer of which has a glass transition temperature of not lower than 115° C., which has good resistance to dry cleaning and resistance to slippage.

9 Claims, No Drawings

WATER- AND OIL-REPELLENT

FIELD OF THE INVENTION

The present invention relates to a water- and oil-repellent. More particularly, the present invention relates to a water- and oil-repellent comprising a copolymer which comprises a monomeric compound having at least a perfluoroalkyl or perfluoroalkenyl group and an acrylate or methacrylate group.

BACKGROUND OF THE INVENTION

It is known that a polymer comprising a monomeric compound having at least a perfluoroalkyl or perfluoroalkenyl group and an acrylate or methacrylate group is useful as a water- and oil-repellent for fabrics (cf. U.S. Pat. No. 4,296,224).

In order to improve resistance to laundry and/or dry cleaning, several proposals have been made. However, a proposal has been not made in regard to improving resistance to slippage, for example, fabric shift. The woven fabric treated with a conventional water- and oil-repellent tends to have inferior resistance to slippage to non-treated woven fabric. In the present specification, "slippage" is used to mean movement or shift of threads in the fabrics due to external force.

SUMMARY OF THE INVENTION

One object of the present invention is to provide a water- and oil-repellent with good durability, namely resistance to dry cleaning.

Another object of the present invention is to provide a water- and oil-repellent which can impart good resistance to slippage in fabrics, particularly woven fabrics.

These and other objects are accomplished by a water- and oil-repellent comprising a copolymer which comprises repeating units derived from (a) a monomeric compound having at least a perfluoroalkyl or perfluoroalkenyl group and an acrylate or methacrylate group and (b) a methacrylate homopolymer of which has a glass transition temperature ($T_g$) of not lower than 115° C.

DETAILED DESCRIPTION OF THE INVENTION

The water- and oil-repellent is preferably in the form of an aqueous dispersion, although it may be in the form of a solution or an aerosol.

Examples of the methacrylate the homopolymer of which has a $T_g$ not lower than 115° C., preferably not lower than 130° C., are isobornyl methacrylate ($T_g$ of the homopolymer: 180° C.) and 4-cyanophenyl methacrylate ($T_g$ of the homopolymer: 155° C.). Preferably, the copolymer comprises 5 to 50% by weight of the methacrylate (b) based on the total weight of the copolymer. When the content of the methacrylate (b) is less than 5% by weight, the water- and oil-repellent cannot impart sufficient resistance to slippage in the fabrics. Any content of the methacrylate (b) larger than 50% by weight is not economical since the resistance to slippage is not improved in proportion to the increase of the content of methacrylate (b).

The monomeric compound (a) has a perfluoroalkyl or perfluoroalkenyl group and an acrylate or methacrylate group. Examples of such monomeric compound (a) are described in, for example, Japanese Patent Publication No. 47041/1980 and Japanese Patent Kokai Publication (unexamined) Nos. 45756/1980 and 71779/1980.

Preferred examples of the monomeric compound (a) are those of the formulas:

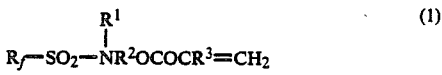

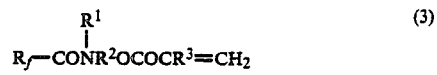

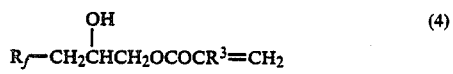

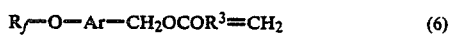

wherein $R_f$ is a $C_3$–$C_{21}$ perfluoroalkyl or perfluoroalkenyl group; $R^1$ is a hydrogen atom or a $C_1$–$C_{10}$ alkyl group; $R^2$ is a $C_1$–$C_{10}$ alkylene group; $R^3$ is a hydrogen atom or a methyl group; Ar is a substituted or unsubstituted aryl group; and n is an integer of 1 to 10.

Specific examples of the monomeric compound (a) are

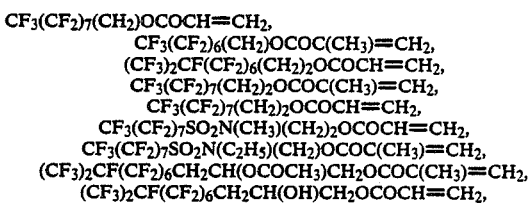

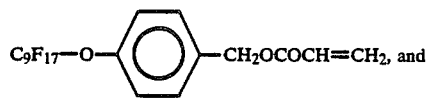

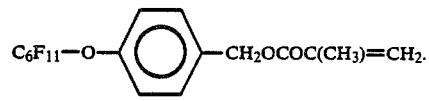

The content of the monomeric compound (a) in the copolymer is at least 25% by weight, preferably at least 40% by weight.

In addition to the monomeric compound (a) and the methacrylate (b), the copolymer to be used according to the present invention may further comprise at least one other copolymerizable monomer. Examples of such other copolymerizable monomer are:

(1) Acrylic and methacrylic acid; methyl, ethyl, butyl, isobutyl, propyl, 2-ethylhexyl, hexyl, decyl, lauryl, stearyl, β-hydroxyethyl, hydro- or alkyl-polyoxyethylene, glycidyl and benzyl esters of acrylic acid; and ethyl, butyl, hexyl, decyl, lauryl, stearyl, β-hydroxyethyl, chlorohydroxypropyl, hydro- or alkyl-polyoxyethylene and glycidyl esters of methacrylic acid, (2) Vinyl esters of an aliphatic acid such as acetic acid, propionic acid, caprylic acid, lauric acid and stearic acid, (3) Styrene and its derivatives such as α-methylstyrene and p-methylstyrene,
(4) Vinyl halide and vinylidene halide such as vinyl fluoride, vinyl chloride, vinyl bromide, vinylidene fluoride and vinylidene chloride,
(5) Allyl esters such as allyl heptanoate, allyl caprylate and allyl caproate,
(6) Vinyl alkyl ketones such as vinyl methyl ketone and vinyl ethyl ketone,
(7) Acrylamides such as N-methylacrylamide and N-methylolmethacrylamide, and
(8) Dienes such as 2,3-dichloro-1,3-butadiene and isoprene.

The copolymer to be used according to the present invention is prepared by a per se conventional method for polymerizing a vinyl compound. For polymerization of the monomeric compound (a), methacrylate (b) and optionally at least one other copolymerizable monomer, any polymerization mode such as bulk, solution, suspension, emulsion and radiation polymerization can be used. Since the water- and oil-repellent of the invention is usually used in the form of an aqueous dispersion, the emulsion polymerization is preferred.

For example, the emulsion polymerization is carried out in a reactor equipped with a stirrer and temperature controlling equipment. A mixture of the monomers is emulsified in an aqueous solution of a surfactant in an amount of about 5 to 50% by weight. The reaction proceeds at a temperature of about 40° to 70° C. in the presence of a polymerization initiator which is used to initiate polymerization of an ethylenically unsaturated compound. Specific examples of the initiator are 2,2'-azodiisobutylamidine dihydrochloride, 2,2'-azodiisobutyronitrile, 2,2'-azobis(2,4-dimethyl-4-methoxyvaleronitrile), sodium peroxide, barium peroxide, hydrogen peroxide, ammonium persulfate and the like. The amount of the initiator is usually from 0.1 to 2% by weight based on the total weight of the monomers. For controlling the molecular weight of the copolymer, a small amount of a conventional chain transfer agent such as alkanethiol having 4 to 12 carbon atoms may be added to the polymerization system.

The surfactant may be any one of cationic, anionic or nonionic emulsifiers, preferably a cationic one and a nonionic one or a mixture thereof. Specific examples of the cationic surfactant are dodecyltrimethylammonium acetate, trimethyltetradecylammonium chloride, hexadecyltrimethylammonium bromide, trimethyloctadecylammonium chloride, (dodecylmethylbenzyl)-trimethylammonium chloride, benzyldodecyldimethylammmonium chloride, methyldodecyl(hydropolyoxyethylene)ammonium chloride, benzyldocosyl(hydropolyoxyethylene)ammonium chloride, N-[2-(diethylamino)ethyl]oleamide hydrochloride and the like. Specific examples of the nonionic surfactant are condensation products of ethylene oxide with hexylphenol, isooctacylphenol, hexadecanol, oleic acid, $C_{12}$–$C_{16}$ alkanethiol, sorbitan mono-($C_7$–$C_{19}$)-aliphatic acid ester or $C_{12}$–$C_{18}$ alkylamine.

The water- and oil-repellent of the invention is applied to a substrate such as film, fiber, yarn and thread, woven or nonwoven fabric and an article produced from filaments, fibers or yarns made of a natural polymeric material, a modified natural polymeric material or a synthetic polymeric material.

The water- and oil-repellent of the invention is preferably applied to the substrate by coating, dipping, spraying, padding or roll coating or by a combination of two or more of these methods. For example, a highly concentrated dispersion prepared by the emulsion polymerization is diluted with water and optionally the surfactant to a solid content of 0.1 to 10% by weight. The diluted emulsion is used as a pad bath. The substrate is padded in such a bath and excess liquid is removed by squeeze rollers so that the dried substrate carries about 0.01 to 1% by weight of the copolymer. Then, the treated substrate is dried at a temperature of 100° to 200° C.

The present invention will be explained further in detail by following examples.

In the examples, water repellency is expressed by the water repellency No. (cf. Table 1) determined according to the spray method as described in JIS (Japanese Industrial Standards) L-1005, and oil repellency is expressed by the oil repellency No. determined according to AATCC-118-1975 by dropping several drops of a test solvent on each of two spots of a surface of the cloth treated with the water- and oil-repellent and observing the penetrating state after a period of 30 seconds (cf. Table 2).

TABLE 1

| Water repellency No. | State |
|---|---|
| 100 | No wet at the surface |
| 90 | Slight wet at the surface |
| 80 | Partial wet at the surface |
| 70 | Wet at the surface |
| 50 | Wet over the whole surface |
| 0 | Complete wet through the surface to the reverse |

TABLE 2

| Oil repellency No. | Test solvent |
|---|---|
| 8 | n-Heptane |
| 7 | n-Octane |
| 6 | n-Decane |
| 5 | n-Dodecane |
| 4 | n-Tetradecane |
| 3 | n-Hexadecane |
| 2 | n-Hexadecane/Nujol (weight ratio, 35/65) |
| 1 | Nujol |
| 0 | Worse than 1 |

Resistance to dry cleaning is determined by washing a cloth treated with the water- and oil-repellent at 30° C. in tetrachloroethylene (100 ml) containing a detergent (1.0 g) (Ripal P, a trade name of Lion Corporation, Japan, which is a mixture of an anionic surfactant and a nonionic surfactant) for one hour and drying it. The resistance to dry cleaning is evaluated by the difference of water and oil repellency Nos. after one cycle and five cycles of dry cleaning.

Resistance to slippage is determined according to ASTM D 1336-64 (1970) by means of a fabric shift tester and expressed in terms of fabric shift (mm). The smaller the shift, the better the resistance to slippage.

EXAMPLE 1

In a 300 ml glass flask equipped with a thermometer, a stirrer and a reflux condenser, a mixture of $CF_3$-$(CF_2)_n CH_2CH_2OCOCH=CH_2$ wherein n is 5, 7, 9, 11 and 13 in a weight ratio of 1:65:25:6:2 (65 g), isobornyl methacrylate (33 g), 1-chloro-2-hydroxypropyl methacrylate (2 g), stearyltrimethylammonium chloride (2 g), polyoxyethylene(20)octyl phenyl ether (5 g), acetone (20 g), ethyleneglycol (10 g), pure water (120 g), n-laurylmercaptane (0.1 g) and azobisisobutylamidine dihydrochloride (0.2 g) were charged and dispersed in a nitrogen atmosphere with stirring. After stirring for one hour, the interior temperature was raised to 60° C. to initiate polymerization and polymerization was carried out for 3 hours at the same temperature to give an emulsified latex containing 35.5% by weight of the copolymer.

With the produced latex, resistance to dry cleaning and slippage were examined. For these measurements, a mixed fabric of polyester and cotton (65/35) (for measuring resistance to dry cleaning) or a Nylon taffeta (for measuring resistance to slippage) was dipped in the latex and squeezed by a mangle to 65% of wet pickup, dried at 80° C. for 3 minutes and heated at 150° C. for 3 minutes.

The results are shown in Table 3.

EXAMPLE 2

In the same manner as in Example 1 but using 4-ccyanophenyl methacrylate in place of isobornyl methacrylate, the polymerization was carried out to obtain a latex. Resistance to dry cleaning and slippage are shown in Table 3.

Comparative Example 1

In the same manner as in Example 1 but using lauryl methacrylate ($T_g$ of the homopolymer, $-65°$ C.) in place of isobornyl methacrylate, the polymerization was carried out to obtain a latex containing 35.0% by weight of the copolymer. Resistance to dry cleaning and slippage are shown in Table 3.

Comparative Example 2

In the same manner as in Example 1 but using stearyl acrylate ($T_g$ of the homopolymer, $-80°$ C.) in place of isobornyl methacrylate, the polymerization was carried out to obtain a latex containing 35.3% by weight of the copolymer. Resistance to dry cleaning and slippage are shown in Table 3.

TABLE 3

| Example No. | Resistance to dry cleaning | | | | Resistance to slippage (Blank value = 1.2 mm) |
|---|---|---|---|---|---|
| | Water repellency No. | | Oil repellency No. | | |
| | 1 cycle | 5 cycles | 1 cycle | 5 cycles | |
| 1 | 100 | 90 | 6 | 5 | 0.2–0.4 |
| 2 | 100 | 90 | 6 | 5 | 0.2–0.4 |
| Comp. 1 | 90 | 50 | 6 | 3 | 1.2–1.4 |
| Comp. 2 | 80 | 50 | 5 | 3 | 1.6 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:
1. A water- and oil-repellent copolymer, comprising:
   (a) at least one monomeric compound selected from the group consisting of:

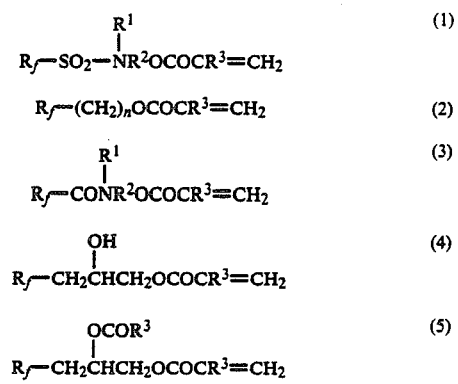

wherein $R_f$ is a $C_3$-$C_{21}$ perfluoroalkyl or perfluoroalkenyl group; $R^1$ is a hydrogen atom or a $C_1$-$C_{10}$ alkyl group; $R^2$ is a $C_1$-$C_{10}$ alkylene group; $R^3$ is a hydrogen atom or a methyl group; n is an integer of 1 to 10; and
   (b) 5 to 50% by weight, based on the total weight of the copolymer, of a methacrylate selected from the group consisting of isobornyl methacrylate and 4-cyanophenyl methacrylate, a homopolymer of which has a glass transition temperature (Tg) of not lower than 115° C.

2. A water- and oil-repellent copolymer, comprising:
   (a) at least one monomeric compound selected from the group consisting of:

$$CF_3(CF_2)_7(CH_2)OCOCH=CH_2,$$
$$CF_3(CF_2)_6(CH_2)OCOC(CH_3)=CH_2,$$
$$(CF_3)_2CF(CF_2)_6(CH_2)_2OCOCH=CH_2,$$
$$CF_3(CF_2)_7(CH_2)_2OCOC(CH_3)=CH_2,$$
$$CF_3(CF_2)_7(CH_2)_2OCOCH=CH_2,$$
$$CF_3(CF_2)_7SO_2N(CH_3)(CH_2)_2OCOCH=CH_2,$$
$$CF_3(CF_2)_7SO_2N(C_2H_5)(CH_2)_2OCOC(CH_3)=CH_2,$$
$$(CF_3)_2CF(CF_2)_6CH_2CH(OCOCH_3)CH_2OCOC(CH_3)=CH_2,$$
$$(CF_3)_2CF(CF_2)_6CH_2CH(OH)CH_2OCOCH=CH_2,$$

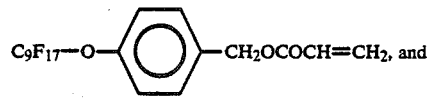

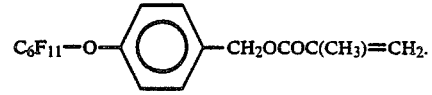

(b) 5 to 50% by weight, based on the total weight of the copolymer, of a methacrylate selected from the group consisting of isobornyl methacrylate and 4-cyanophenyl methacrylate, a homopolymer of which has a glass transition temperature (Tg) of not lower than 115° C.

3. The water- and oil-repellent according to claim 1, wherein the methacrylate (b) is one wherein a homopolymer of which has a glass transition temperature not lower than 130° C.

4. The water- and oil-repellent copolymer according to claim 1, wherein the content of said monomeric compound (a) in the copolymer is at least 25% by weight.

5. The water- and oil-repellent copolymer according to claim 1, wherein said copolymer further comprises at least one other copolymerizable vinyl monomer.

6. The water- and oil-repellent copolymer according to claim 1, wherein component (b) has a sufficiently large molecular weight so that Tg is independent of the molecular weight.

7. The water- and oil-repellent copolymer according to claim 2, wherein the content of said monomeric compound (a) in the copolymer is at least 25% by weight.

8. The water- and oil-repellent copolymer according to claim 2, wherein said copolymer further comprises at least one other copolymerizable vinyl monomer.

9. The water- and oil-repellent copolymer according to claim 2, wherein the methacrylate (b) is one wherein a homopolymer of which has a glass transition temperature not lower than 130° C.

* * * * *